United States Patent
Meziache et al.

(10) Patent No.: US 10,536,836 B2
(45) Date of Patent: Jan. 14, 2020

(54) METHOD AND DEVICE FOR MANAGING INFORMATION EXCHANGE BETWEEN A MAIN ELEMENT, FOR EXAMPLE A NFC CONTROLLER, AND A SET OF AT LEAST TWO AUXILLARY ELEMENTS

(71) Applicants: STMicroelectronics (Rousset) SAS, Rousset (FR); STMICROELECTRONICS GMBH, Grassbrunn (DE)

(72) Inventors: Thierry Meziache, Sainte Baume (FR); Pierre Rizzo, Mountain View, CA (US); Alexandre Charles, Auriol (FR); Juergen Boehler, Munich (DE)

(73) Assignees: STMicroelectronics (Rousset) SAS, Rousset (FR); STMicroelectronics GmbH, Aschheim-Dornach (DE)

(*) Notice: Subject to any disclaimer, the term of this patent is extended or adjusted under 35 U.S.C. 154(b) by 11 days.

(21) Appl. No.: 15/994,607

(22) Filed: May 31, 2018

(65) Prior Publication Data

US 2018/0279104 A1 Sep. 27, 2018

Related U.S. Application Data

(63) Continuation of application No. 15/335,636, filed on Oct. 27, 2016, now Pat. No. 10,244,372, which is a (Continued)

(30) Foreign Application Priority Data

Dec. 15, 2010 (EP) .................................. 10306416
Mar. 30, 2011 (EP) .................................. 11305359

(51) Int. Cl.
*H04B 7/00* (2006.01)
*H04W 4/80* (2018.01)
(Continued)

(52) U.S. Cl.
CPC ............ *H04W 4/80* (2018.02); *G06K 7/0008* (2013.01); *G06K 7/10237* (2013.01); *G06K 7/10247* (2013.01); *H04B 5/0031* (2013.01)

(58) Field of Classification Search
CPC ................................................. G06K 7/10237
See application file for complete search history.

(56) References Cited

U.S. PATENT DOCUMENTS

| | | | | |
|---|---|---|---|---|
| 6,424,820 B1 * | 7/2002 | Burdick | ............... | H04B 5/0081 455/132 |
| 8,086,176 B2 * | 12/2011 | Teruyama | ............ | G06K 7/0008 455/41.1 |

(Continued)

FOREIGN PATENT DOCUMENTS

| | | |
|---|---|---|
| CN | 101639890 A | 2/2010 |
| CN | 101772215 A | 7/2010 |

(Continued)

OTHER PUBLICATIONS

Database WPI, Week 201015, Thomson Scientific, London, GB, AN 2010-B60078, XP002663010, 1112011, pp. 1-2.

(Continued)

*Primary Examiner* — Guang W Li
(74) *Attorney, Agent, or Firm* — Slater Matsil, LLP

(57) ABSTRACT

A device, including a main element (ME) and a set of at least two auxiliary elements (SEi), said main element including a master SWP interface (MINT), each auxiliary element including a slave SWP interface (SLINTi) connected to said master SWP interface of said NFC element through a controllably switchable SWP link (LK) and management means (PRM, CTLM, AMGi) configured to control said SWP link switching for selectively activating at once only one slave SWP interface on said SWP link.

32 Claims, 14 Drawing Sheets

Related U.S. Application Data continuation of application No. 13/994,283, filed as application No. PCT/EP2011/072474 on Dec. 12, 2011, now Pat. No. 9,515,701.

(51) Int. Cl.

| | | |
|---|---|---|
| *G06K 7/00* | (2006.01) | |
| *G06K 7/10* | (2006.01) | |
| *H04B 5/00* | (2006.01) | |

(56) References Cited

U.S. PATENT DOCUMENTS

| | | | |
|---|---|---|---|
| 8,324,824 B2 | 12/2012 | Lin et al. | |
| 8,670,710 B2 * | 3/2014 | Miles | G06K 7/0008 |
| | | | 235/492 |
| 8,750,324 B2 | 6/2014 | Hansquine et al. | |
| 9,087,227 B2 * | 7/2015 | Kulkarni | G06K 7/0008 |
| 9,396,364 B2 * | 7/2016 | Hoeksel | G06K 7/0008 |
| 2005/0185720 A1 * | 8/2005 | Kwok | H04B 3/50 |
| | | | 375/257 |
| 2008/0006704 A1 * | 1/2008 | Kim | G06K 7/10247 |
| | | | 235/492 |
| 2008/0010562 A1 * | 1/2008 | Kim | G06F 13/4291 |
| | | | 714/55 |
| 2008/0085001 A1 * | 4/2008 | Charrat | H04L 9/3273 |
| | | | 380/247 |
| 2008/0144650 A1 * | 6/2008 | Boch | G06K 7/0008 |
| | | | 370/464 |
| 2008/0245851 A1 * | 10/2008 | Kowalski | G06K 7/10178 |
| | | | 235/375 |
| 2009/0011648 A1 * | 1/2009 | Kargl | G06K 7/0008 |
| | | | 439/630 |
| 2009/0157928 A1 * | 6/2009 | Riegebauer | H04L 12/403 |
| | | | 710/110 |
| 2009/0206984 A1 * | 8/2009 | Charrat | H04L 63/08 |
| | | | 340/5.2 |
| 2009/0275364 A1 * | 11/2009 | Morel | G06K 7/10297 |
| | | | 455/558 |
| 2009/0312011 A1 * | 12/2009 | Huomo | G06K 7/0008 |
| | | | 455/426.1 |
| 2010/0009627 A1 * | 1/2010 | Huomo | H04B 5/0031 |
| | | | 455/41.1 |
| 2010/0019033 A1 * | 1/2010 | Jolivet | G06K 7/0008 |
| | | | 235/380 |
| 2010/0178868 A1 * | 7/2010 | Charrat | G06Q 20/3278 |
| | | | 455/41.1 |
| 2010/0277104 A1 * | 11/2010 | Lin | H03K 7/08 |
| | | | 315/312 |
| 2010/0330904 A1 * | 12/2010 | Stougaard | H04L 67/12 |
| | | | 455/41.1 |
| 2011/0170456 A1 * | 7/2011 | Marseille | H04M 1/72519 |
| | | | 370/277 |
| 2011/0294418 A1 * | 12/2011 | Chen | G06K 7/0008 |
| | | | 455/41.1 |
| 2012/0032789 A1 * | 2/2012 | Ichimaru | G06Q 20/3226 |
| | | | 340/10.5 |
| 2012/0052801 A1 * | 3/2012 | Kulkarni | G06K 7/0008 |
| | | | 455/41.1 |
| 2012/0083902 A1 | 4/2012 | Daum et al. | |
| 2012/0100804 A1 * | 4/2012 | Miles | G06K 7/0008 |
| | | | 455/41.1 |
| 2012/0108169 A1 | 5/2012 | DeGauque et al. | |
| 2012/0131234 A1 * | 5/2012 | Thill | G06K 7/10247 |
| | | | 710/13 |
| 2012/0135681 A1 * | 5/2012 | Adams | H04B 5/0025 |
| | | | 455/41.1 |
| 2012/0159030 A1 * | 6/2012 | Huomo | G06K 19/07 |
| | | | 710/301 |
| 2012/0298760 A1 * | 11/2012 | Li | G06K 7/10237 |
| | | | 235/492 |
| 2014/0022060 A1 * | 1/2014 | Boehler | H04L 63/0492 |
| | | | 340/10.51 |
| 2014/0127998 A1 * | 5/2014 | Miles | G06K 7/0008 |
| | | | 455/41.1 |

FOREIGN PATENT DOCUMENTS

| | | |
|---|---|---|
| EP | 2251986 A1 | 11/2010 |
| WO | 2008114931 A1 | 9/2008 |

OTHER PUBLICATIONS

ETSI TR 102 216 V3.0.0, (Sep. 2003), Smart cards; Vocabulary for Smart Card Platform specifications, 19 pages.

ETSI TS 102 613 V7.7.0 (Oct. 2009); Smart Cards; UICC—Contactless Front-end (CLF) Interface; Part 1: Physical and data link layer characteristics (Release 7); 58 pages.

ETSI TS 102 622 V13.0.0 (Oct. 2016), Technical Specification, Smart Cards; UICC—Contactless Front-end (CLF) Interface; Host Controller Interface (HCI) (Release 13); 75 pages.

ISO/IEC 14443-1, International Standard, Second edition, Jun. 15, 2008, Identification cards—Contactless integrated circuit cards—Proximity cards—Part 1: Physical characteristics, 12 pages.

ISO/IEC 14443-2, International Standard, Jul. 1, 2001, Identification cards—Contactless integrated circuit cards—Proximity cards—Part 2: Radio Frequency power and signal interface, 32 pages.

ISO/IEC 14443-3, International Standard, First edition, Feb. 1, 2001, Identification cards—Contactless integrated circuit (s) cards—Proximity cards—Part 3: Initialization and anticollision, 58 pages.

ISO/IEC 14443-4, International Standard, First edition, Feb. 1, 2001, Identification cards—Contactless integrated circuit (s) cards—Proximity cards—Part 4: Transmission protocol, 44 pages.

ISO/IEC 18092, International Standard, First edition Apr. 1, 2004, Information technology—Telecommunications and information exchange between systems—Near Field Communication—Interface and Protocol (NFCIP-1), 8 pages.

\* cited by examiner

METHOD AND DEVICE FOR MANAGING INFORMATION EXCHANGE BETWEEN A MAIN ELEMENT, FOR EXAMPLE A NFC CONTROLLER, AND A SET OF AT LEAST TWO AUXILLARY ELEMENTS

CROSS-REFERENCE TO RELATED APPLICATIONS

This application is a continuation of U.S. patent application Ser. No. 15/335,636, filed Oct. 27, 2016, which application is a continuation of U.S. patent application Ser. No. 13/994,283, filed Sep. 6, 2013, now U.S. Pat. No. 9,515,701, which application is a National Stage entry of PCT Application No. PCT/EP2011/072474, filed on Dec. 12, 2011, which application claims priority to EP Patent Application Nos. 11305359.9, filed Mar. 30, 2011 and 10306416.8, filed Dec. 15, 2010, which applications are hereby incorporated herein by reference.

TECHNICAL FIELD

The invention relates to the communication between components or elements, in particular between a contactless element, for example a NFC ("Near Field Communication") controller element and at least two auxiliary elements, such as a UICC or secure elements, for example located within a wireless apparatus, for example a mobile phone.

BACKGROUND

As defined within ETSI TR 102 216 V3.0.0 (2003-09), UICC which is neither an abbreviation nor an acronym, designates a smart card that conforms to the specifications written and maintained by the ETSI Smart Card Platform project.

Further to its conventional telephone function, a mobile phone may be used for exchanging information with a contactless device by using a contactless communication protocol.

This permits to exchange information between the contactless device and elements located within the mobile phone. Plenty of applications are thus possible such as mobile ticketing in public transport (the mobile phone acts as a boarding pass) or mobile payment (the mobile phone acts as a debit/credit payment card).

Near Field Communication or NFC is a short range high frequency wireless communication technology which enables such exchange of data between two contactless devices over a short distance, for example 10 centimeters.

NFC is an open platform technology standardized in ISO/IEC 18092 and ISO/IEC 21481 but incorporates a variety of pre-existing standards including ISO/IEC 14443 protocol type A and type B.

Mobile phone manufacturers are interested in connecting two different auxiliary elements to NFC chips. As a matter of fact, having two separate auxiliary elements allows two clearly separate applications coming from different issuers (banks, transport operators, telephone operators . . . ).

ETSI TS 102 613 is a standard disclosing in particular the principle of a so-called Single Wire Protocol (SWP). The SWP is a bit oriented point-to-point communication protocol between a contactless front end (CLF) also called a NFC controller, and a UICC. However, this single wire protocol as defined in ETSI TS 102 613 permits only the communication between one contactless element, for example one NFC controller and one UICC.

A first solution for managing information exchange between a NFC controller and two elements consists in providing a NFC controller with one SWP interface for secure elements based on SWP-UICC technology and a second interface (for example a NFC Wired Interface: NFC-WI) for proprietary secure elements. However, such solution makes the design of a NFC controller more complex as an additional interface has to be managed in a time critical environment.

A second solution consists in offering NFC controllers provided with two SWP interfaces. This solution would allow using of two secure elements provided with SWP-UICC technology but again, it will make the design of the NFC controller more complex as an additional interface has to be managed.

SUMMARY

According to an embodiment, a method and a device are proposed for managing in a simple way, information exchange between a contactless element such as NFC controller, and several (at least two) auxiliary elements by using the already existing hardware technology without any modification of the software on secure elements provided with SWP-UTCC technology.

According to an aspect, a method of managing information exchange between a main element, in particular a contactless element, for example a NFC element such as a NFC controller, and a set of at least two auxiliary elements is provided which comprises providing each auxiliary element with a slave SWP interface, providing said main element with a master SWP interface, connecting said slave SWP interfaces to said master SWP interface through a controllably switchable SWP link and controlling said SWP link switching for selectively activating at once only one slave SWP interface on said SWP link.

A slave SWP interface is considered to be activated when for example it is capable, after an activation phase including transmission of particular control data, to exchange information with the master interface on the SWP link related for example to a particular contactless application.

According to an embodiment, connecting said slave SWP interfaces to said master SWP interface through a controllably switchable SWP link comprises connecting a controllable multiplexer/demultiplexer switch between said master SWP interface and said slave SWP interfaces and controlling said SWP link switching comprises controlling said multiplexer/demultiplexer switch for switching the SWP link to said selected slave SWP interface.

According to an embodiment, said method further comprises forcing the part of the SWP link connected between each non-selected slave SWP interface and the multiplexer/demultiplexer switch in a deactivated state.

This permits for the non-selected slave SWP interface, to simulate the presence of the master element even if this master element is actually exchanging information with the selected slave interface.

Further, as the parts of the SWP link connected between each selected slave SWP interface and the multiplexer/demultiplexer switch are forced in a deactivated state, there is no risk that one of said non-selected slave SWP interface detects a non-working SWP link, while the selected slave SWP interface is active.

As a matter of fact, an auxiliary element cannot initiate SWP communication while SWP link is deactivated.

According to an embodiment, said method further comprises controlling said SWP link switching when the SWP link is in a deactivated state.

In other words, it is only possible to switch the SWP link to another auxiliary element when the SWP is deactivated. Thus, all auxiliary elements assume a deactivated SWP link and all auxiliary elements will not recognize any change on SWP link when SWP switching happens.

Activating said selected slave SWP interface may comprise performing an initial activation of said selected slave SWP interface or a subsequent activation of said selected slave SWP interface.

According to an embodiment, either all the auxiliary elements operate in a first operation mode, for example in a full power mode, or only one auxiliary element operates in a second operation mode, for example in a low power mode, having a power value lower than the power value of the first operation mode, while each other auxiliary element is OFF, and when said only one auxiliary element operates in a second operation mode, controlling said SWP link comprises forcing the SWP link switching into a predetermined configuration allowing the selection of said only one auxiliary element.

This permits to surely have a switching of the SWP link to said only one auxiliary element, even if the multiplexer/demultiplexer switch is not sufficiently powered.

According to another embodiment, either all the auxiliary elements operate in the first operation mode, or at least a first auxiliary element operates in the second operation mode, and when said first auxiliary element operates in a second operation mode, said first auxiliary element controls said SWP link switching for selecting only one auxiliary element operating in a second operation mode.

It is thus possible to have a more flexible configuration in the low power mode.

More particularly, a configuration indication may be stored in said first auxiliary element, and said first auxiliary element controls said SWP link switching by using said configuration indication.

While it is possible to store the configuration indication during the fabrication of the device, thus fixing a configuration by default for the low operation mode, it is particularly advantageous that for example the user of a wireless apparatus may decide himself the configuration in the low power mode.

And in this respect said configuration indication may be stored in said first auxiliary element when all the auxiliary elements operate in said first operation mode, for example through an user interface.

According to an embodiment said first auxiliary element operates in a second operation mode, said first auxiliary element controls the powering of each other auxiliary element in order to place each other auxiliary element in an OFF state, and said first auxiliary element controls said SWP switching for selecting said first auxiliary element operating in a second operation mode.

According to another embodiment said first auxiliary element operates in a second operation mode, said first auxiliary element controls the powering of a second auxiliary element in order to permit said second auxiliary element to operate in a second operation mode, and said first auxiliary element controls the SWP link switching for selecting said second element operating in a second operation mode.

Said first auxiliary element may control the powering of said second auxiliary element or each other auxiliary element by using said configuration indication.

According to another aspect, a device is proposed, comprising a main element and a set of at least two auxiliary elements, said main element including a master SWP interface, each auxiliary element including a slave SWP interface connected to said master SWP interface of said NFC element through a controllably switchable SWP link and management means configured to control said SWP link switching for selectively activating at once only one slave SWP interface on said SWP link.

According to an embodiment, the device comprises a controllable multiplexer/demultiplexer switch having a first terminal coupled to said master SWP interface through a first part of said SWP link and at least two second terminals respectively coupled to said at least two slave SWP interfaces through at least two second parts of said SWP link, and said management means comprise control means configured to control said multiplexer/demultiplexer switch.

Said control means may be advantageously located within said main element.

According to an embodiment, the device further comprises first forcing means configured to force each second part of the SWP link connected between each non selected slave SWP interface and the multiplexer/demultiplexer switch in a deactivated state.

According to an embodiment, said first forcing means comprise at least two pull-down resistors respectively connected between said at least two second parts of said SWP link and a reference voltage.

According to an embodiment, said management means comprise processing means configured to put said SWP link in a deactivated state, and said control means are configured to control said multiplexer/demultiplexer switch after said processing means have put the SWP link in said deactivated state.

Said management means may be configured to perform either an initial activation or a subsequent activation of said selected SWP slave interface.

According to an embodiment, the device has a first state in which all the auxiliary elements are able to operate in a first operation mode, for example in a full power mode, and a second state in which only one auxiliary element is able to operate in a second operation mode, for example in a low power mode, having a power value lower than the power value of the first operation mode, and each other auxiliary element is OFF, and said device further comprises second forcing means configured, when said link switching into further comprises second forcing means device is in its second state, to force the SWP a predetermined configuration allowing the selection of said only one auxiliary element.

According to an embodiment, said second forcing means comprise another pull-down resistor connected between the control input of said multiplexer/demultiplexer switch and a voltage reference.

According to a variant the device has a first state in which all the auxiliary elements are able to operate in the first operation mode, and a second state in which at least a first auxiliary element is able to operate in the second operation mode and said device comprises auxiliary selection means at least partly incorporated in said first auxiliary element and configured, when said device is in its second state, to control said SWP link switching for selecting only one auxiliary element operating in a second operation mode.

According to an embodiment said auxiliary selection means comprises auxiliary memory means incorporated in said first auxiliary element for storing a configuration indication, and auxiliary control means configured to control the SWP link switching from said configuration indication.

Said auxiliary selection means may further comprise auxiliary input means configured to store said configuration indication is stored in said auxiliary memory means when the device is in its first state.

Said auxiliary selection means may be further configured, when said device is in its second state, to control the powering of each other auxiliary element in order to place each other auxiliary element in an OFF state, and to select said first auxiliary element operating in a second operation mode.

Said auxiliary selection means may be also configured, when said device is in its second state, to control the powering of a second auxiliary element in order to permit said second auxiliary element to operate in a second operation mode, and to select said second element operating in a second operation mode.

According to an embodiment said auxiliary selection means comprises auxiliary power control means configured to control the powering of said second auxiliary element or each other auxiliary element from said configuration indication.

According to an embodiment, one auxiliary element may be packed with said main element and another auxiliary element, for example a SIM card, may be removably connected to said main element.

Said main element may be a contactless element, for example a NFC controller.

According to another aspect, an apparatus, for example a wireless communication apparatus, is proposed comprising an antenna and a device as defined above, coupled to said antenna.

According to an embodiment, one auxiliary element may be permanently fixed within said apparatus and another auxiliary element, for example a SIM card, may be removably lodged within said apparatus and removably connected to said main element.

BRIEF DESCRIPTION OF THE DRAWINGS

Other advantages and features of the invention will appear on examining the detailed description of embodiments, these being no way limiting, and of the appended drawings in which.

DETAILED DESCRIPTION OF ILLUSTRATIVE EMBODIMENTS

Embodiments of the invention will be now described in the technical field of contactless elements or components connected to secure elements, in particular embedded in a mobile phone, although the invention is not limited to these particulars embodiments.

A contactless element is an element or a component able to exchange information through an antenna with a contactless device according to contactless communication protocol.

A NFC element or component, which is a contactless element, is an element or component compliant with the NFC technology.

Figure 1:
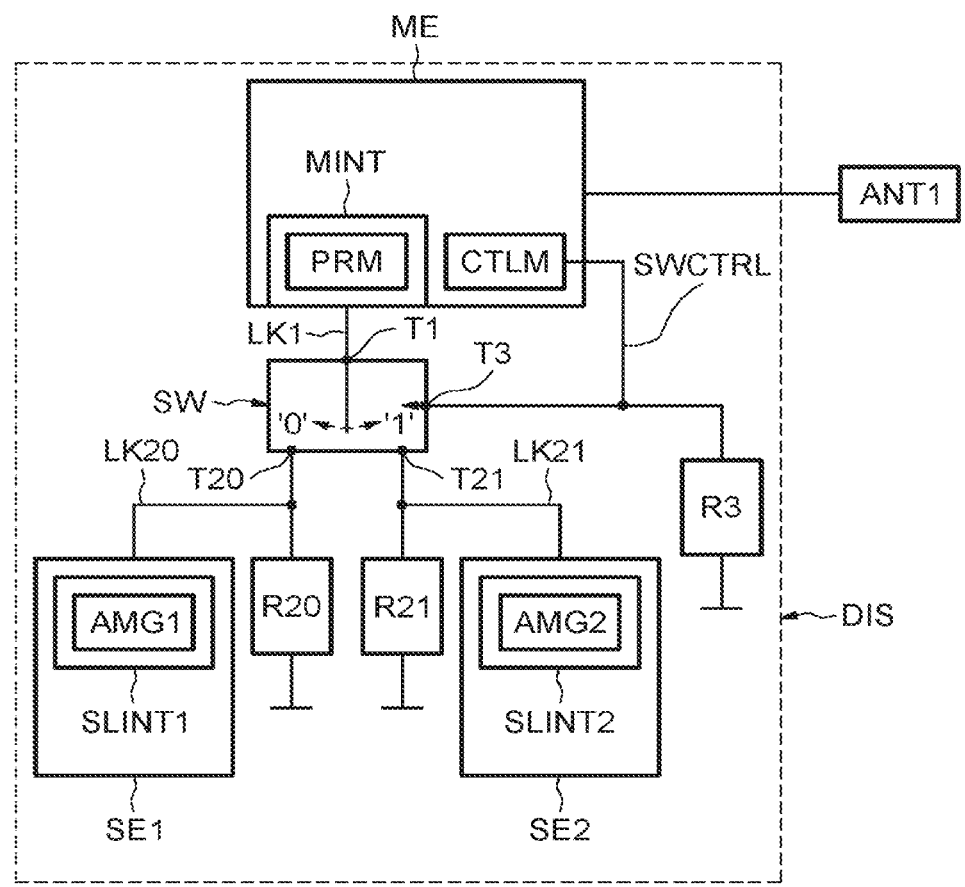
FIG. 1 illustrates schematically an embodiment of a device according to the invention.

In FIG. 1, an example of a device DIS according to the invention is illustrated which comprises a contactless front end element ME, for example a NFC controller, having a SWP interface MINT.

The device comprises also here two auxiliary elements or secure elements. Each secure element SE1, SE2 comprises an SWP interface SLINT 1, SLINT2. Each SWP interface SLINTi is connected to the same SWP interface MINT of the NFC controller ME through a controllably switchable SWP link LK.

A secure element is for example an element adapted to contain secure or protected information, for example banking information, information related to telephone subscription, among others.

Each SWP interface SLINTi comprises auxiliary management means AMGi while the SWP interface MINT of the NFC controller ME comprises processing means PRM.

The NFC controller ME is coupled to an antenna ANTI for exchanging information with a contactless reader by using a contactless communication protocol, for example the one disclosed in ISO/IEC 14443.

The Single Wire Protocol (SWP) is a bit oriented, point-to-point communication protocol between a secure element and a contactless front end, and is specified in the standard ETSI TS 102 613, for example the version V7.7.0 (2009-10) thereof. The man skilled in the art could refer if necessary to this document, the content thereof being incorporated by reference in the present patent application.

Figure 2:
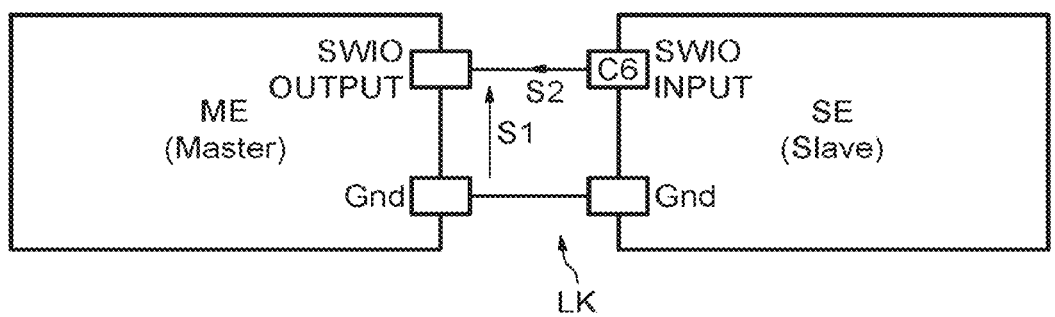
FIGS. 2 and 3 illustrate connections between a main element and auxiliary elements through a SWP link.

More precisely, as illustrated in FIG. 2, the NFC controller ME is the master whereas a secure element SE is a slave. The master and a slave are mutually connected through a SWP link LK.

A SWP link is a link or line adapted to support the Single Wire Protocol (SWP).

As disclosed in ETSI TS 102 613, the principle of the single wire protocol (SWP) is based on the transmission of digital information in full duplex mode. The signal S1 from ME to SE is transmitted by a digital modulation (L or H) in the voltage domain whereas the signal S2 from SE to ME is transmitted by a digital modulation (L or H) in the current domain.

When the master sends S1 as state H then the slave may either draw a current (state H) or not (state L) and thus transmits S2. With pulse width modulation bit coding of S1, it is possible to transmit a transmission clock, as well as data in full duplex mode. More details can be found in ETSI TS 102 613.

Figure 3:
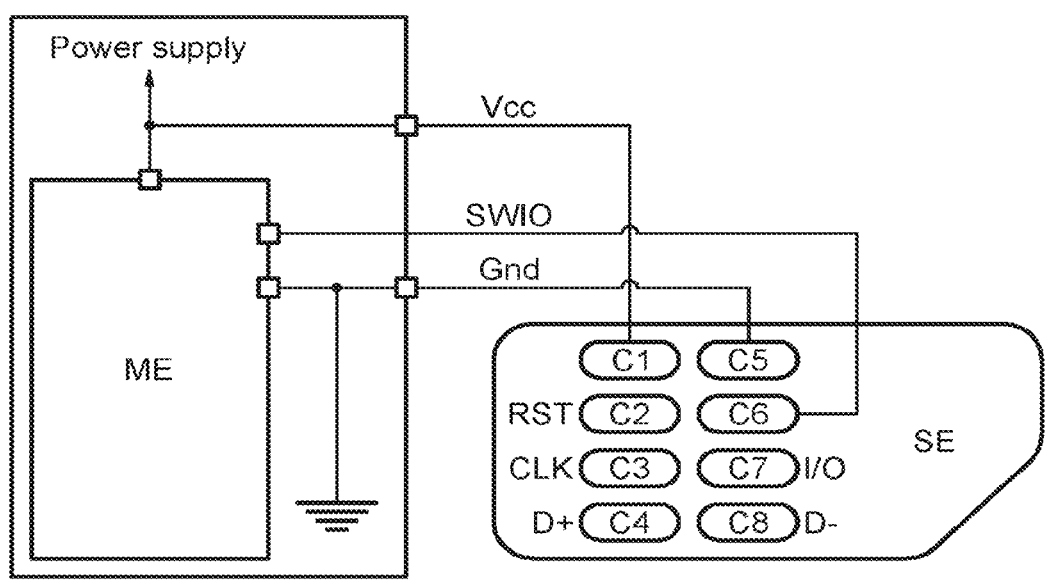

FIG. 3 represents an embodiment of the physical link between the contactless element ME and a secure element SE. More precisely, as illustrated in this figure and explained in ETSI TS 102 613, the contact C6 of the secure element is connected to the port SWIO of the contactless element ME for transmission of signal S1 and S2.

The SWP protocol specified in ETSI TS 102 613 permits only the communication between the master SWP interface of the contactless element and a single slave SWP interface of a single secure element.

According to an aspect of the invention which will be now described more in details, it will be possible to connect two or more than two auxiliary elements or secure elements SEi provided with a SWP-UICC technology to a single master SWP interface of a contactless element, for example a NFC controller.

More precisely, if we refer again to FIG. 1, this will be possible in particular by connecting a controllable multiplexer/demultiplexer switch SW between said master SWP interface MINT and said slave SWP interfaces SLINT1, SLINT2, and by controlling said switch SW by control means C TLM for switching the SWP link to the selected slave SWP interface.

Here, the processing means PRM, the control means CTLM and the auxiliary management means AMGi form management means configured to control the SWP link switching for selectively activating at once only one selected slave SWP interface on said SWP link.

The management means and the control means may be realized by software module and at least partly by logic circuit.

In the present embodiment, where only two auxiliary elements are used, the multiplexer/demultiplexer switch SW has a first terminal T1 coupled to said master SWP interface MINT though a first part LK1 of said SWP link LK and two second terminals T20 and T21 respectively coupled to said two slave SWP interfaces SLINT1, SLINT2 through two second parts LK20, LK21 of said SWP link.

Of course, although the parts LK1, LK20 and LK21 have been represented here by wires between the terminals T1, T20, T21 and the corresponding terminals of the SWP interfaces, these parts may be reduced to the minimum if for example the terminals T1, T20, T21 respectively meet the corresponding terminals of the SWP interfaces.

The switch SW further comprises a control terminal T3 connected to the control means CTLM for receiving a control signal SWCTRL for switching the first terminal T1 to either the second terminal T20 or the second terminal T21, depending on the logic value of the control signal.

For example, as illustrated in FIG. 1, if the control signal SWCTRL has the logic value "0", the first terminal T1 is connected to the second terminal T20 while the first terminal T1 is connected to the second terminal T21 if the control signal SWCTRL has the logic value "1".

As defined in ETSI TS 102 613, a SWP link may have an activated state, a suspended state and a deactivated state.

More precisely, in the activated state, the master element and the selected auxiliary element are sending bits.

In the suspended state, the signal S1 is in state H and the signal S2 is in state L.

In the deactivated state, the signal S1 is in state L and the signal S2 is in state L.

As it will be explained more in details thereafter, controlling the switch SW is only performed when the SWP link LK is in its deactivated state.

Further, when a secure element (SE1 for example) has been selected, the part of the SWP link seen by the other non-selected secure element (SE2 for example), is advantageously in a deactivated state.

Placing such part of the SWP link in a deactivated state is equivalent to placing the C6 contact of said corresponding non-selected secure element in a low state, typically at ground.

Resistors R20 and R21 respectively connected between the second terminal T20 and a voltage reference, for example ground, and between second terminal T21 and the voltage reference, are pull down resistors. And, the pull down resistor R20 permits to force the part LK20 of the SWP link in a deactivated state when the secure element SE2 has been selected while pull down resistor R21 forces the part LK21 of the SWP link in its deactivated state when the secure element SE1 has been selected.

Further, another pull down resistor R3 connected between the control input T3 and the voltage reference (ground, for example) permits to force the control input to the logical value "0" thereby forcing the switch in the predetermined configuration in which terminal T1 is connected to terminal T20, in the case the switch SWP is not sufficiently or not at all powered.

The value of each pull down resistor is chosen to have for example a current having a very small value, for example 5 µA or 10 µA.

Figure 4:
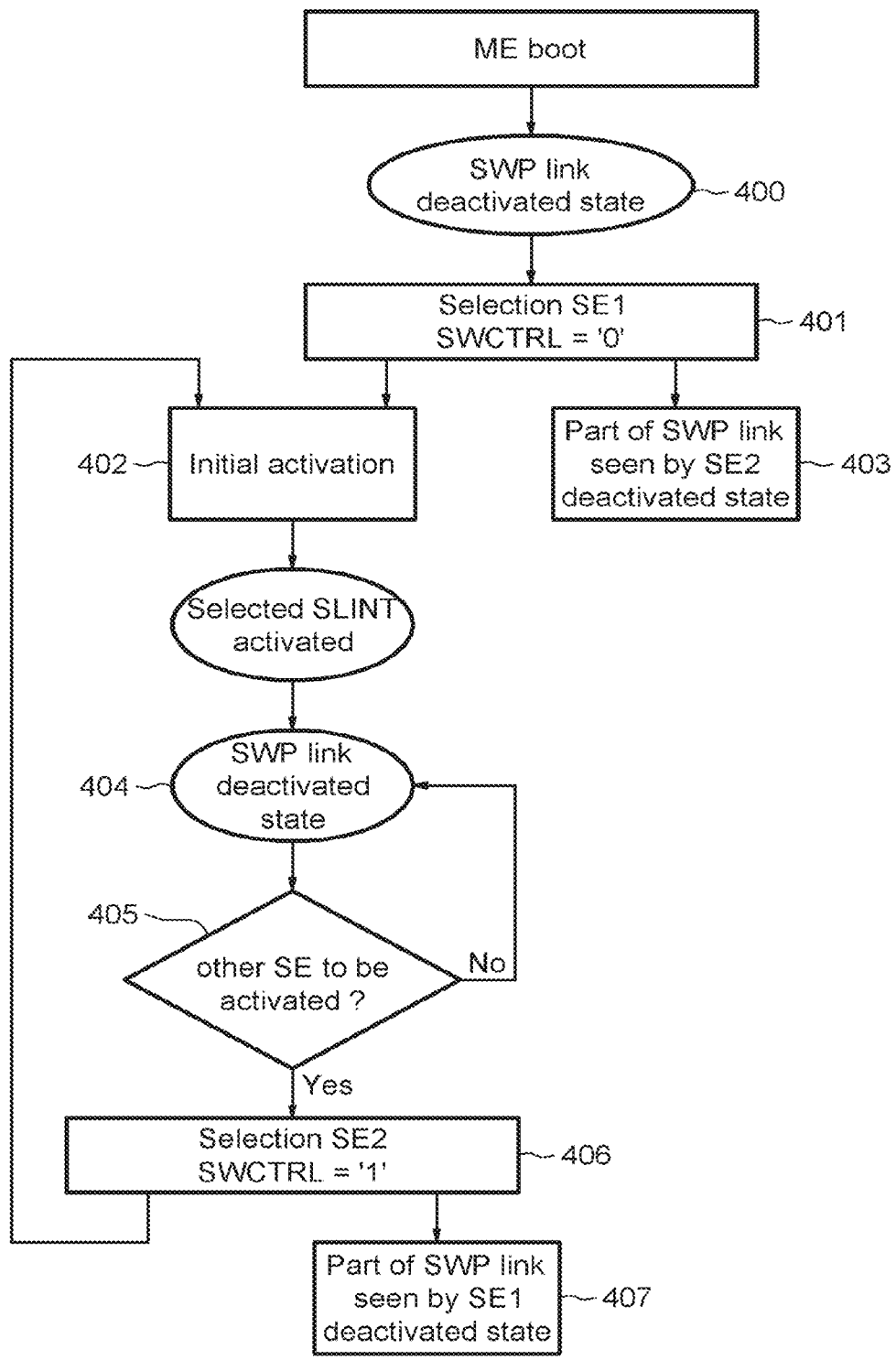
FIGS. 4, 5a, 5b illustrate diagrammatically examples of flow charts of several embodiments of a method according to the invention.
Figure 5A:
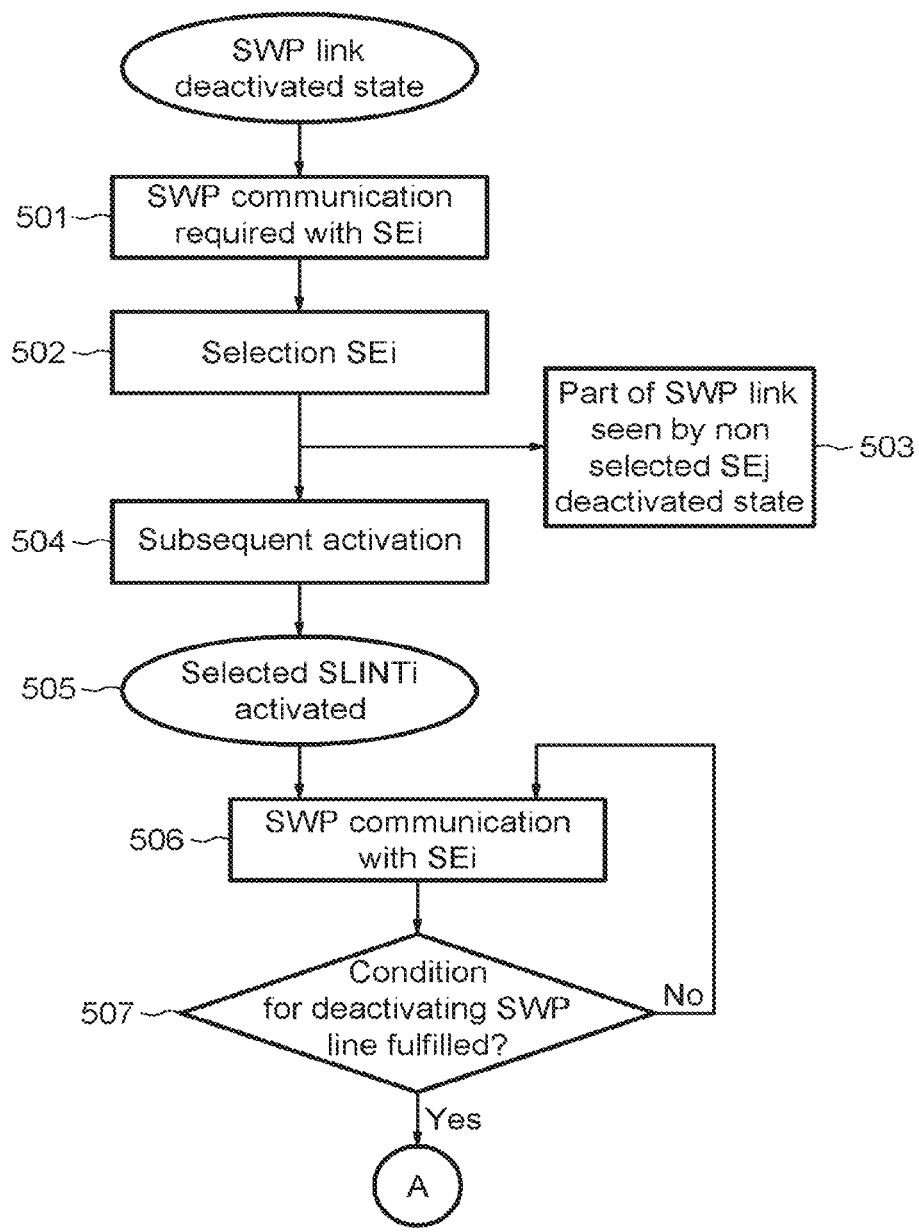
Figure 5B:
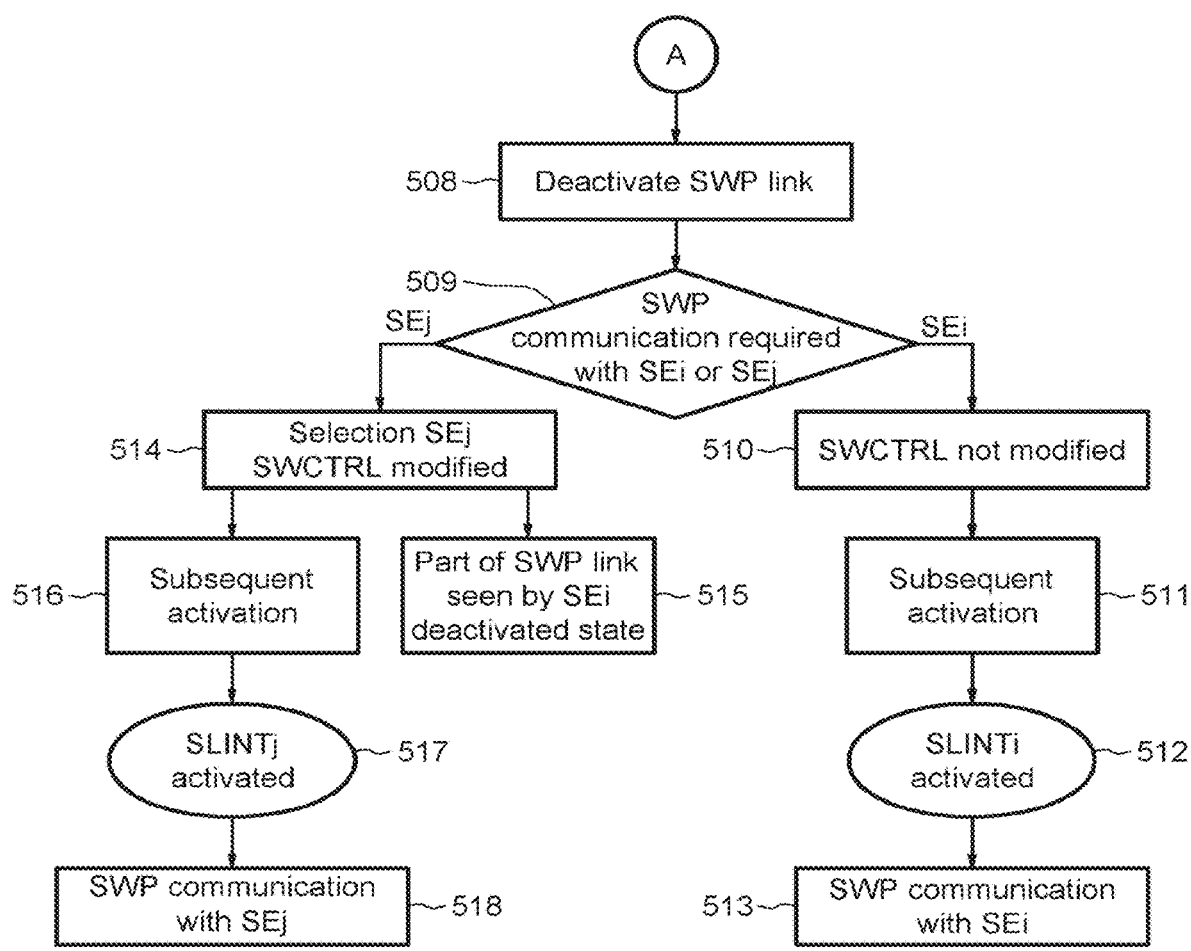

We refer now more particularly to FIG. 4, which illustrates a particular embodiment of a method according to the invention.

After the master element boot, the processing means PRM of the master element put the SWP link in its deactivated state (step 400) in order to select (step 401) one secure element, for example secure element SE1. In this respect, the control signal SWCTRL has the logic value "0".

Since the secure element SE1 has been selected, the part LK21 of the SWP link seen by the other non-selected secure element SE2 is forced to be in a deactivated state by the pull down resistor R21 (the signal S1 is pulled down to state L by the resistor R21).

Of course, as explained above, forcing the part of the SWP link seen by the non-selected secure element in its deactivated state is equivalent to forcing the potential of the C6 contact of said secure element to a low state (ground, for example).

Once the secure element SE1 has been selected, the management means (processing means and auxiliary management means) perform an initial SWP activation (step 402) of the corresponding slave SWP interface, as defined in ETSI TS 102 613.

Activating a slave SWP interface leads to place said slave SWP interface in an activated state. For example, activating a slave SWP interface comprises performing an activation phase during which control data are exchanged between the master interface and the slave interface. At the end of the activation phase, the master and the slave have been mutually "recognized" and the slave is ready to exchange payload information related to a particular contactless application with the contactless element. The slave interface is thus activated (or in an activated state).

Once initial SWP activation sequence is finished, the processing means of the main element ME put the SWP link into its suspended state, and wait for communication from the activated slave interface of the secure element.

If the conditions are fulfilled to deactivate the secure element, the processing means of the main element put the SWP link in its deactivated state (step 404). Such conditions are for example those detailed in point 8.3 of ETSI TS 102 613.

Now, the main element ME is able to switch the SWP link between the secure element SE1 and the secure element SE2 (step 406).

In this respect, the switch control SWCTRL takes the logic value "1".

An initial SW activation (step 402) is performed for the secure element SE2, while the part LK20 of SWP link seen by the non-selected secure element SE1 is forced in its deactivated state by the pull-down resistor R20 (step 407).

For example, an event which can lead to an initial SWP activation of secure element SE2, which is for example a UICC, is the reception of a signal from the main processor.

Once initial SWP activation sequence is finished for the secure element SE2, the processing means of the main element ME put SWP link into its suspended state to wait for SWP communication from secure element SE2. If no activity is required on this interface, the processing means of the main element put the SWP link in its deactivated state (step 404).

If other secure element SE is to be activated, thus a new selection is performed followed by an initial activation of this new selected secure element (step 402).

If no other secure element is to be activated (step 405), the SWP link remains in its deactivated state.

At this stage, if a SWP communication with a secure element SEi is required (step 501) (upon, for example, reception of an external event coming from the application supported by this secure element), this secure element SEi is selected (step 502).

Of course, if the switch SWP is already in the configuration for selecting this secure element, no change is performed on the switch.

Then, a subsequent activation (step 504), as defined in ETSI TS 102 613, is performed for this secure element SEi, while the part of SWP link seen by each non-selected secure element SEj (contact C6 of each non-selected secure element SEj) is in its deactivated state (step 503).

Once the selected slave interface SLINTi of the secure element SEi has been activated (step 505), a SWP communication between the main element ME and this secure element SEi may be performed (step 506) until the conditions are fulfilled allowing to deactivate the SWP link as for example described within chapter 8.3 of ETST TS 102 613, for example, until the reception of a signal named EVT_HCI_END_OF_OPERATION in ETSI TS 102 622 (step 507).

Such signal indicates the end of a communication with the secure element SEi.

After the conditions are fulfilled, the SWP link is put again in its deactivated state (step 508) by the processing means PRM of the main element SE.

If a new SW communication is required with the previously selected secure element SEi, thus, the control signal SWCTRL is not modified (step 510) and a subsequent activation (step 511) is performed for activating the slave interface SLINTi of this secure element SEi (step 512) permitting thus the SWP communication with this secure element (Step 513).

If a SWP communication is required with a secure element SEj, different from the previously selected secure element SEi, then, this new secure element SEj is selected (step 514) by modifying the value of the control signal SWCTRL.

A subsequent activation (step 516) is performed for this new selected secure element SEj, while maintaining the contact C6 of each other non-selected secure element in a low state (step 515).

Once the slave interface SLINTj of this secure element SEj has been activated (step 517), a SWP communication between the main element ME and the secure element SEj may be performed (step 518).

An initial activation and a subsequent activation of a slave interface are disclosed in ETSI TS 102 613.

The man skilled in the art may refer to this standard if necessary.

Some details about these activations are now briefly described with reference to FIGS. 6-11.

According to ETSI TS 102 613, particular control frames, called ACT frames, are exchanged between the NFC controller ME and a secure element SE during an activation phase.

Figure 6:
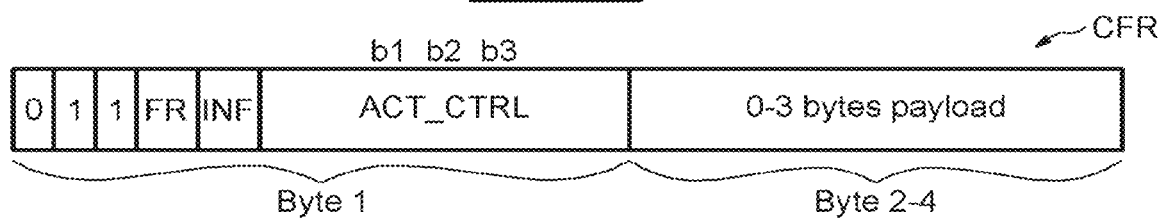
FIGS. 6-9 illustrate diagrammatically examples of frames used in embodiments of the present invention.

Such ACT frame, referenced CPR, is diagrammatically illustrated in FIG. 6.

More precisely, the first three bits of byte 1 of the frame CPR declare the SWP frame as an ACT frame. The FR bit indicates an eventually corrupted previously received ACT frame (only used by the NCF controller ME). The INF bit indicates that the last payload byte contains ACT INFORMATION field and the ACT CTRL bits b1 b2 b3 define the meaning of the ACT frame. After byte 1, 0-3 payload bytes follow, the content thereof depending of the content of ACT_CTRL and FR fields.

Figure 7:
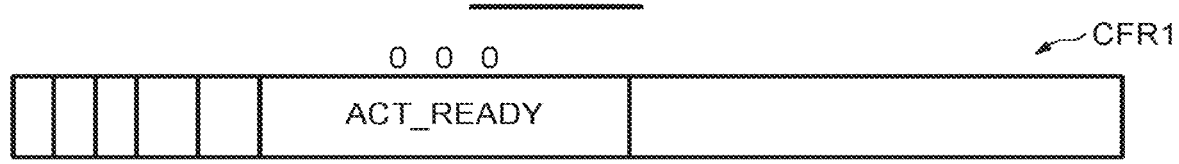

More precisely, when the bits b1 b2 b3 have respectively the binary values 001, the corresponding frame CFR1 is a so-called ACT_READY frame indicating that the secure element has been activated and is ready for exchanging information with the contactless element (FIG. 7).

Figure 8:
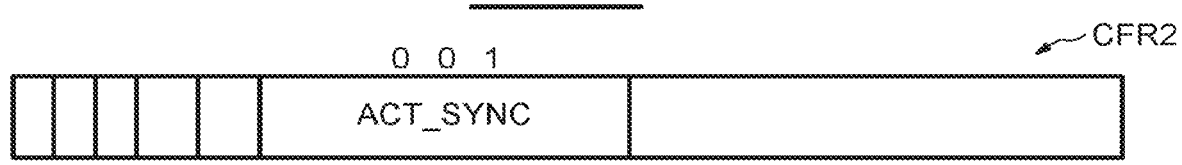
Figure 9:
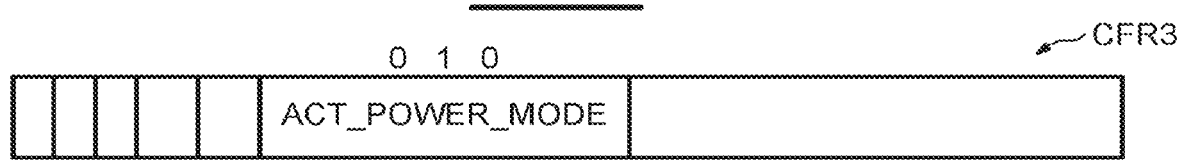

When the bits b1, b2, b3 have respectively the binary values 001, the corresponding frame CFR2 is a so-called ACT_SYNC frame sent by a secure element and containing the identification SYNC_ID of this secure element (FIG. 8).

When the bits b1 b2 b3 have respectively the binary values 010, the corresponding frame CFR3 (FIG. 9) is a so-called ACT POWER MODE frame sent by the contactless element and indicating the power mode (full power or low power).

Figure 10:
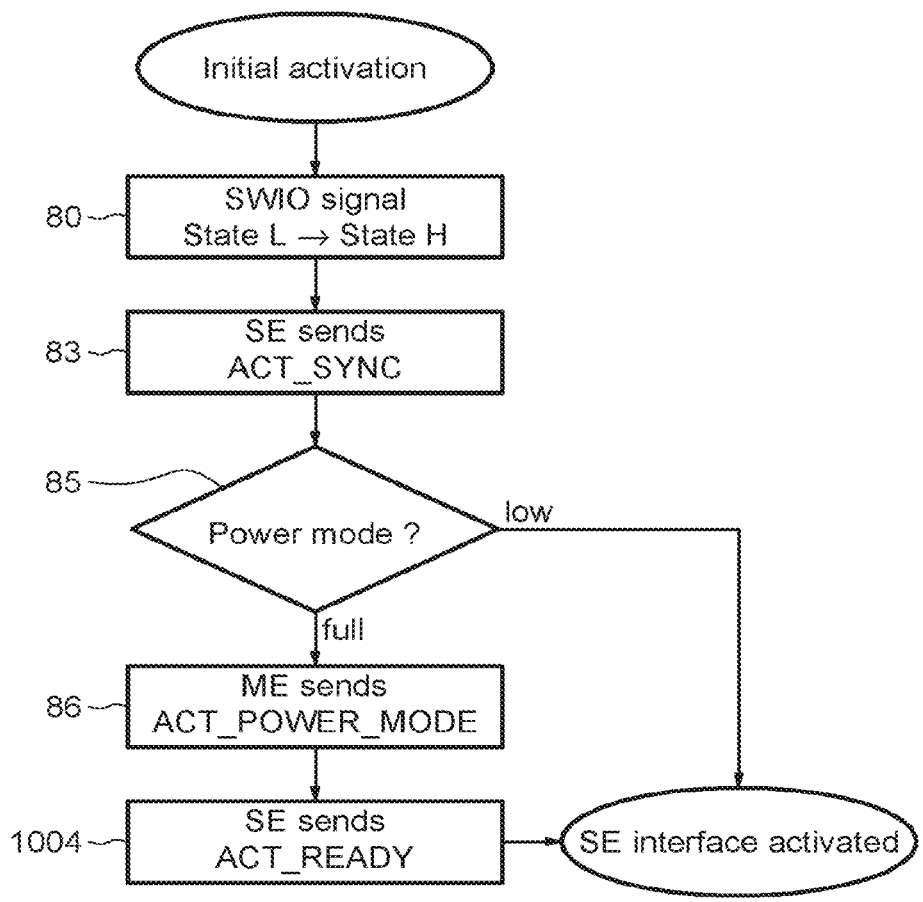
FIGS. 10 and 11 illustrate diagrammatically other examples of flow charts related to initial and subsequent activations.

FIG. 10 is more particularly directed to an initial activation of a slave interface. An initial activation is performed in particular after the first powering up of the device or after a new powering up following a power interruption.

First, the SWIO signal (see FIGS. 2 and 3) which is in its low state L is set to its high state H by the NFC controller (state 80). The SWP link is in its suspended state.

In ETSI TS 102 613 a secure element which detects such state H on its contact C6 has a predetermined duration (700 µs) for resuming the SWP link.

The auxiliary management means of the slave interface of the secure element SE, which is the selected secure element, sends, after having resumed the SWP link, an ACT_SYNC frame CFR2 (step 83).

Then, the activation process continues depending on the power mode (step 85).

More precisely, the NFC controller ME sends an ACT_POWER_MODE frame CFR3 (step 86) in the case of a full power mode.

Upon receipt of this frame CFR3, the auxiliary management means of the selected secure element SE send an ACT READY frame CFR1 (step 87).

The SWP interface of the secure element SEn is thus considered as being activated.

If the power mode is a low power mode, the interface of the selected secure element SE is considered as being activated after step 83.

Figure 11:
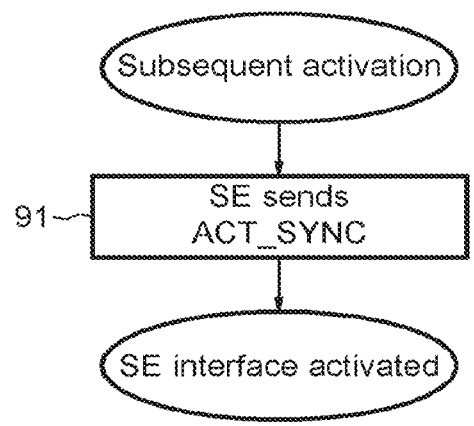

FIG. 11 illustrates diagrammatically a subsequent activation of secure element SE.

In step 91, the auxiliary management means of the secure element SE send on the link LK the ACT_SYNC frame.

The slave SWP interface of the secure element SE is thus considered to be subsequently activated.

Figure 12:
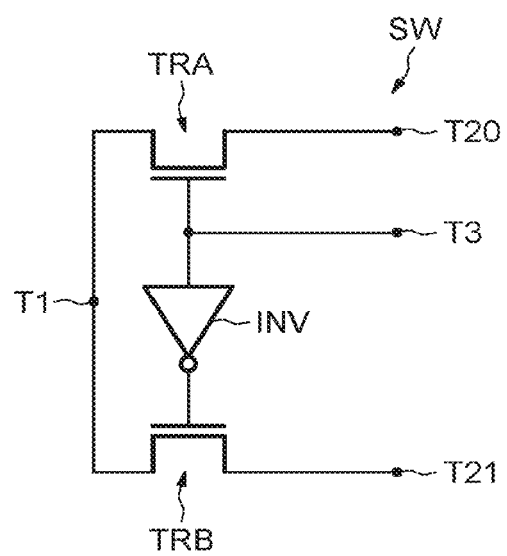
FIG. 12 illustrates diagrammatically an embodiment of a multiplexer-demultiplexer switch in the present invention.

FIG. 12 illustrates diagrammatically an embodiment of an analog multiplexer/demultiplexer switch SW allowing connection with two secure elements.

In this embodiment, the switch SW is a passive switch. It comprises, for example, two NMOS transistors TRA and TRB. The input control T3 of the switch SW is connected to the gate of transistor TRA and to the gate of transistor TRB through an inverter INV.

The terminal T20 of the switch SW is connected to one electrode (the drain, for example) of the transistor TRA, while the terminal T21 of the switch SW is connected to the electrode (the drain, for example) of transistor TRB.

The other electrode (the source, for example) of each transistor TRA and TRB are both connected to the terminal T1 of the switch SW.

It is also possible to use an active multiplexer/demultiplexer switch as for example the one available at the company STMicroelectronics under the reference STG5123.

Such an active multiplexer/demultiplexer switch which is a high-speed CMOS low voltage single analog SPDT (Single-Pole Double Throw) switch or 2:1 multiplexer/demultiplexer switch, has a lower resistivity and a lower input capacity.

Figure 13:
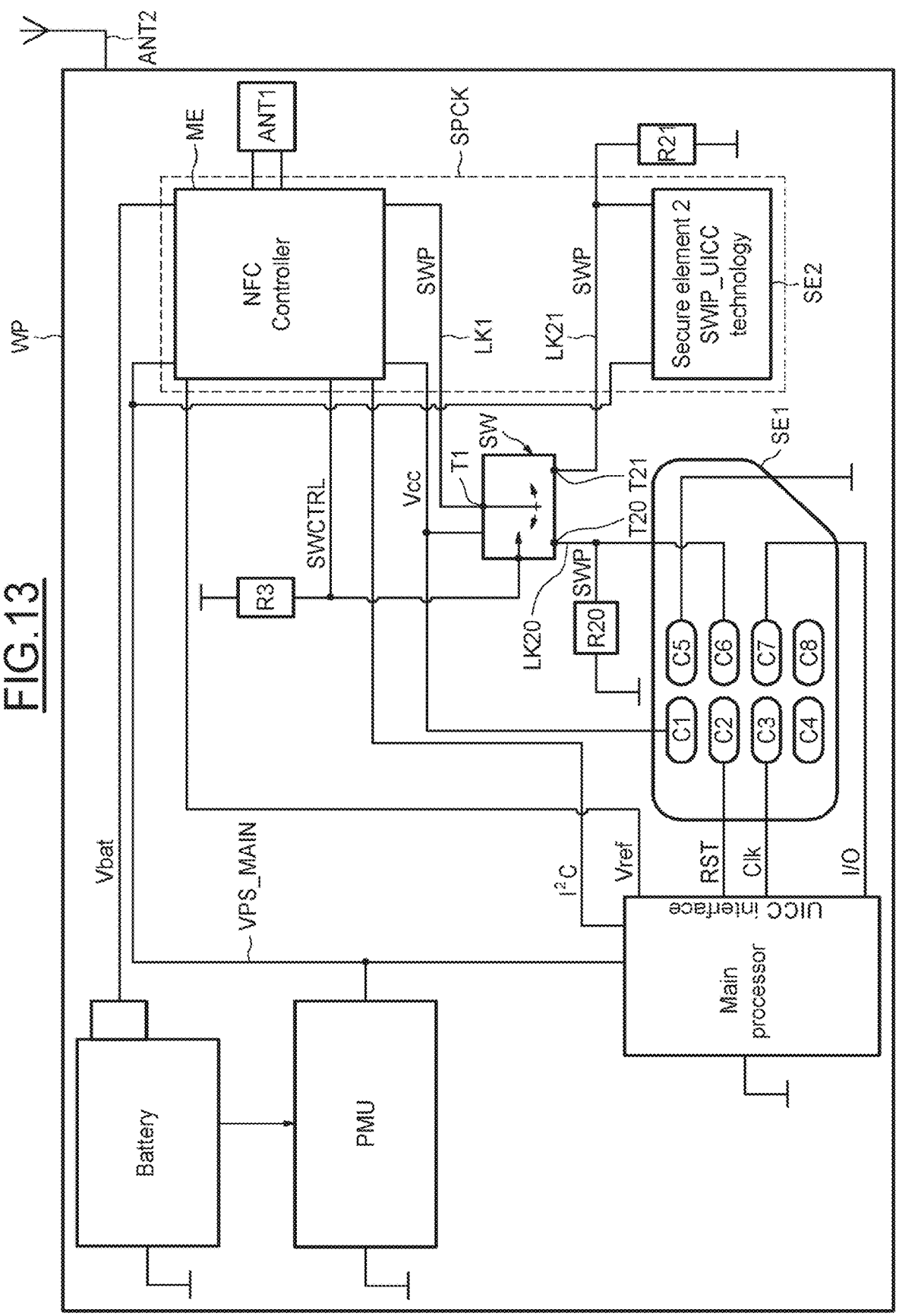
FIGS. 13 and 14 illustrate diagrammatically embodiments of a wireless apparatus according to the invention.
Figure 14:
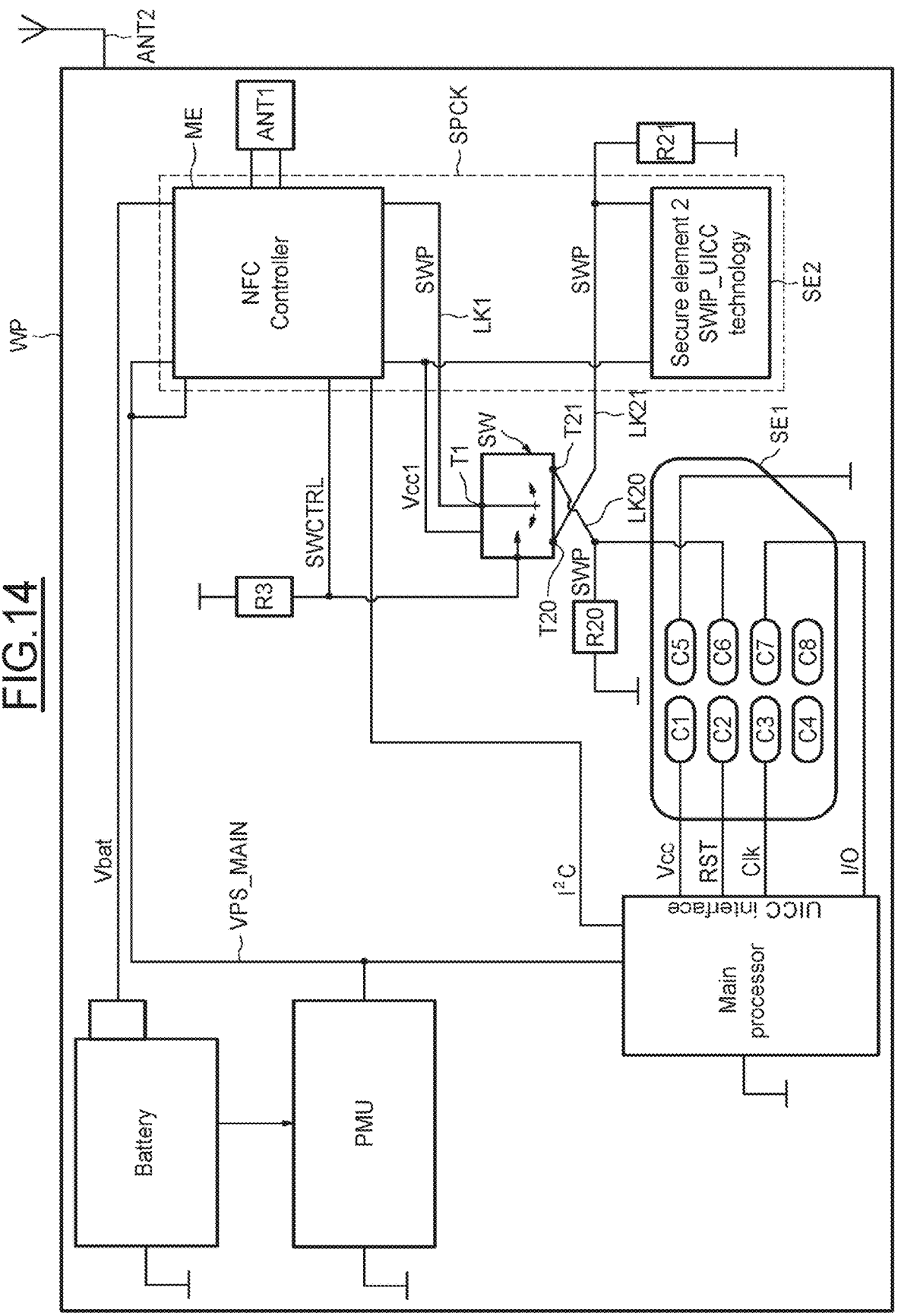

As illustrated in FIG. 13 and in FIG. 14, the device DIS may be incorporated in a wireless apparatus WP such as a mobile phone. More precisely, the mobile phone comprises here conventionally a main processor (application or baseband processor) exchanging information with the secure element SE1, for example a UICC, of the device through signal CLK, RST, I/O compliant with ETSI TS 102 221 permitting thus the telephone functionality through the antenna ANT2.

The NFC controller ME is connected to the main processor through another bus, for example an I²C bus.

The secure element SE2 is for example used for banking operations.

The secure element SE2 is here totally embedded in an integrated circuit containing the NFC controller ME and is for example packed with said NFC controller in a single package SPCK.

While the secure element SE2 is thus permanently fixed within the apparatus WP, the secure element SE1 (UTCC) is removably lodged within the apparatus WP and removably connected to the NFC controller.

The NFC controller is powered by the voltage VPS_main coming from a power management unit PMU connected to a battery. The NFC controller is also directly connected to the battery.

At last, an antenna ANTI permitting an NFC communication with a contactless device is coupled to the NFC controller.

Information related to two different applications may be thus exchange between the secure elements SE1 or SE2 through the NFC controller and the antenna ANTI.

In both embodiments disclosed in FIGS. 13 and 14, the NFC controller ME may, in a full power operation mode, either select the secure element SE1 or the secure element SE2 through the switch SW for performing a SWP communication with selected secure element.

However in the embodiment disclosed in FIG. 13, in a low power mode (for example when the battery is off), the secure element SE1 is powered by the NFC controller ME and SWP communication is only possible with this secure element SE1.

As a matter of fact, the secure element SE1 is connected to terminal T20 of the switch SW and, in a low power mode, the switch SW is forced by the pull down resistor R3 to be in a configuration where terminal T1 is connected to terminal T20.

As indicated above, the power Vcc of the secure element SE1 is delivered by the NFC controller.

In order to be compliant with ETSI TS 102 221 which requires the same power value between the main processor and the ETSI TS 102 221 interface of the secure element SE1, an additional signal Vref indicating the voltage value of the main processor is delivered to the NFC controller.

In the embodiment disclosed in FIG. 14, the secure element SE2 is powered by the NFC controller ME in low power mode and a SWP communication is only possible between the NFC controller and this secure element SE2 in low power mode.

In this respect, as in a low power mode, switch SW is forced by pull down resistor R3 into a configuration in which terminal T1 is connected to terminal T20, the secure element SE2 is connected to terminal 20 while secure element SE1 is connected to terminal T21 of the switch SW.

FIGS. 15 to 18 illustrate diagrammatically another embodiment of the present invention permitting for example the user of the wireless apparatus to choose which auxiliary element will be able to cooperate with the main element (NFC controller) in the low power mode, i.e. when the battery is off.

As for the embodiments illustrated in FIGS. 13 and 14, the device has a first state in which all the auxiliary elements are able to operate in a first operation mode, for example in a full power mode.

Figure 15:
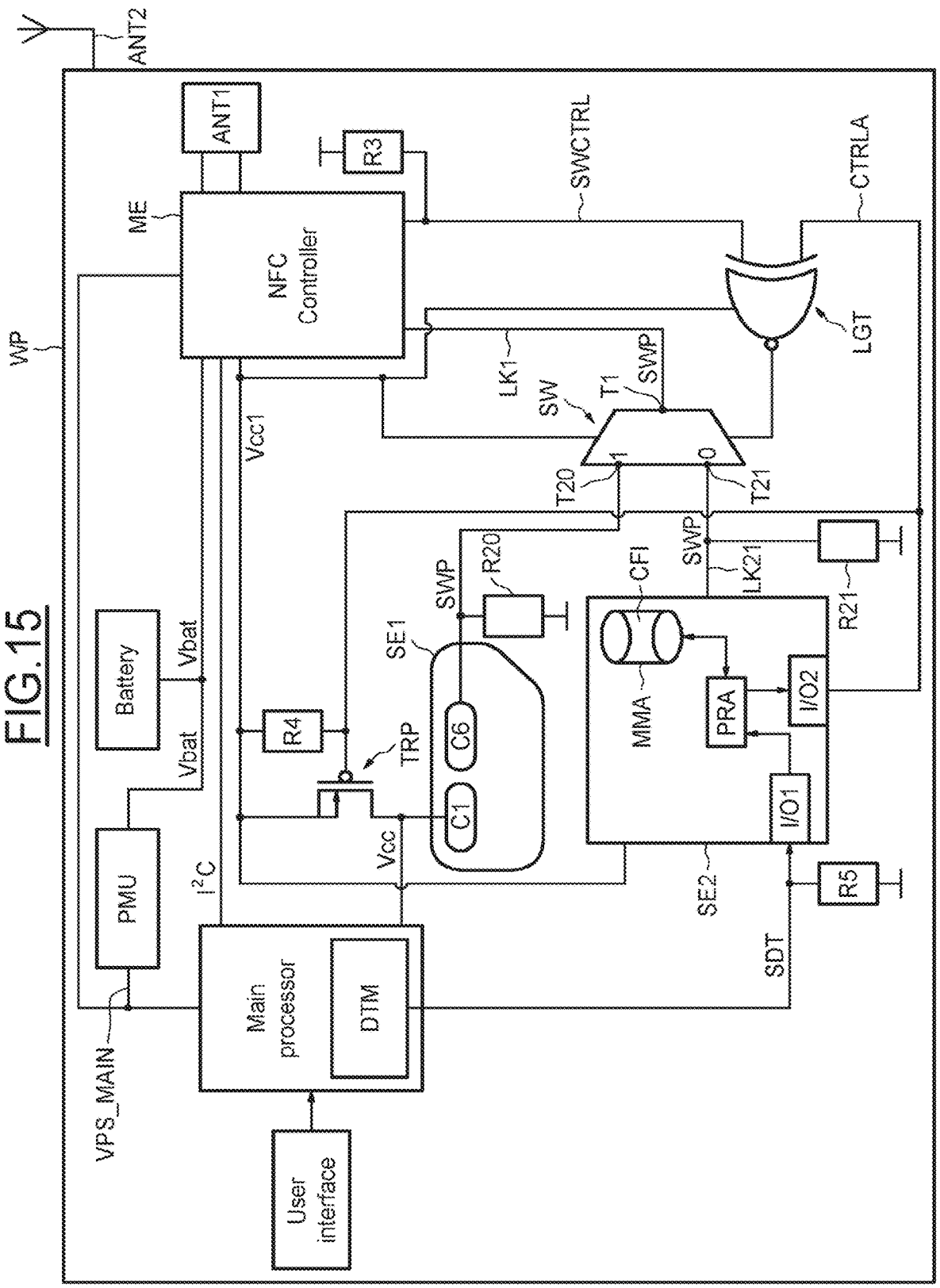
FIGS. 15 to 18 illustrate diagrammatically other embodiments of a method and a wireless apparatus according to the invention.

As it will be explained now more in details the device illustrated in FIG. 15 has a second state in which at least the secure element SE2 is able to operate in a second operation mode, for example in the low power mode.

Thus the device comprises auxiliary selection means at least partly incorporated in said secure element SE2 and configured, when said device is in its second state, to control said SWP link switching for selecting only one auxiliary element operating in a second operation mode, here the secure element SE2.

More precisely, the secure element SE2 is powered by Vcc1 provided by the NFC controller ME.

The contact C1 of the secure element SE1 is connected to the voltage Vcc provided by the main processor in the full power mode, and to the voltage Vcc1 through a PMOS transistor TRP. The gate of this transistor TRP is connected to Vcc1 through a pull-up resistor R4.

The gate of the transistor TRP is also connected to an input/output port I/O2 of the secure element SE2.

This port I/O2 is also connected to a first input of a EXNOR gate LGT.

The second input of the EXNOR gate LGT is connected to the NFC controller for receiving the control signal SWCTRL in the first operation mode, and to the pull down resistor R3 to be forced to the logical value "0" in the second operation mode.

The output of the EXNOR gate LGT is connected to the control input of the switch SW.

Both EXNOR gate LGT and switch SW are powered by Vcc1, which is still available in the second operation mode.

The output terminal T20 of the switch is connected to the contact C6 of the secure element SE1, and the input terminal T1 of the switch is switched to the terminal T20 when the signal present at the control input of the switch has the logical value "1".

The output terminal T21 of the switch is connected to the SWP interface of the secure element SE2, and the input terminal T1 of the switch is switched to the terminal T21 when the signal present at the control input of the switch has the logical value "0".

The secure element comprises also auxiliary processing means PRA connected to auxiliary memory means MMA, to the port I/O2 and to another input/output port I/O1. The auxiliary processing means may be realized by logic circuit and/or by software.

The main processor is also configured to receive from an user interface an indication designating the auxiliary element which is chosen to be able to cooperate with the main element (NFC controller) in the low power mode. This indication is processed by the main processor and sent to the NFC controller through the I²C bus, and then to the secure element SE2 during a SWP transaction in the full power mode. The auxiliary processing means PRA of the secure element are thus configured to store in the auxiliary memory means MMA a corresponding configuration indication CFI.

The main processor comprises also detection means configured to detect the passage from the first state of the device (full power operation mode) to the second state (low power operation mode) and to deliver a corresponding detection signal SDT to the port I/O1. For example this signal SDT is representative of the state ON or OFF of the main processor. For example, when the processor is ON, it sets the signal SDT to the logical value "1", whereas the signal SDT is forced to the logical value "0" by a pull-down resistor RS when the processor is OFF.

The means PRA, MMA, DTM, TRP, LGT, R4 form here said auxiliary selection means.

Figure 16:
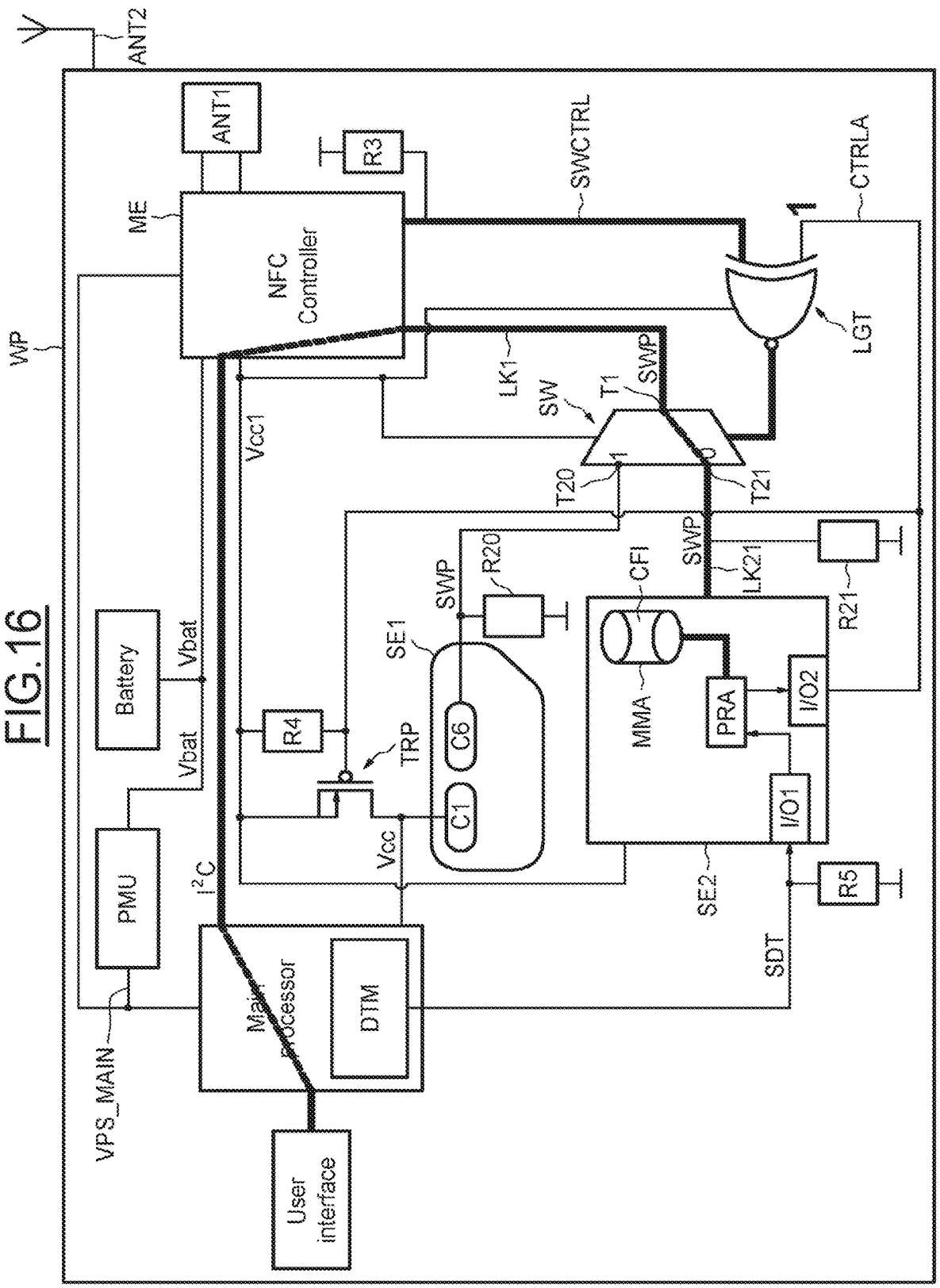

The operation of the device in the first state (full power mode) is now described with reference to FIG. 16.

In this state, all the elements are fully powered by the battery.

The auxiliary control signal CTRLA, provided at the first input of the EXNOR gate LGT, has the logical value "1" due to the pull up resistor R4.

The transistor TRP is off and the secure element SE1 is powered by the Vcc voltage delivered by the main processor.

The NFC controller ME may, in this full power operation mode, either select the secure element SE1 or the secure element SE2 through the switch SW for performing a SWP communication with selected secure element.

As a matter of fact, because the signal CTRLA has the logical value "1" the logical value of the control signal SWCTRL delivered by the NFC controller will be the logical value of the signal fed at the control input of the switch SW.

Further, as explained above, during this full power operation mode, the configuration indication CFI may be delivered to secure element SE2 and stored by the auxiliary processing means PRA in the auxiliary memory means MMA.

Figure 17:
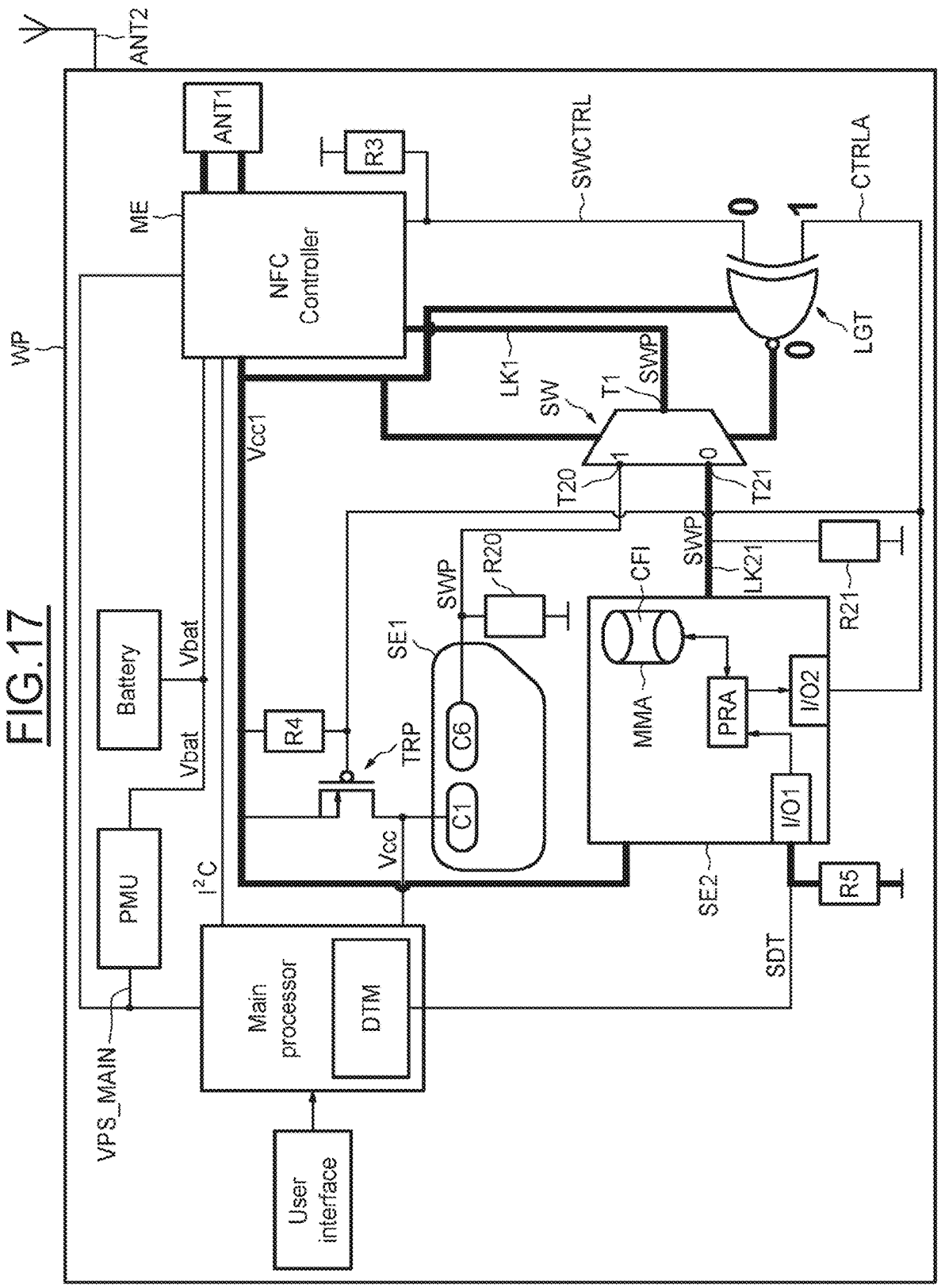

Reference is now made to FIG. 17, to illustrate the case where secure element SE2 is designated by the configuration indication CFI for cooperating with the NFC controller ME through the SWP link during the low power mode.

In the low power mode, the secure element SE2 is powered by the voltage Vcc1 provided by the NFC controller. As in the embodiments illustrated in FIGS. 13 and 14, the NFC controller is itself powered by the electromagnetic field received by the antenna ANT1 during a NFC communication with a contactless device.

Upon receipt of the detection signal SDT having the logical value "0", the auxiliary processing means PRA read the configuration indication CFI stored in the auxiliary memory means and deliver the control signal CTRLA having here the logical value "1".

Further the control signal SWCTRL is forced to the logical value "0" by the pull down resistor R3.

Consequently, the EXNOR gate LGT powered by Vcc1, delivers a logical value "0" to the control input of the switch SW also powered by Vcc1, allowing the selection of the secure element SE2.

It should be noted here that, in this non-limitative particular embodiment, the transistor TRP is off and thus the secure element SE1 is not powered.

Figure 18:
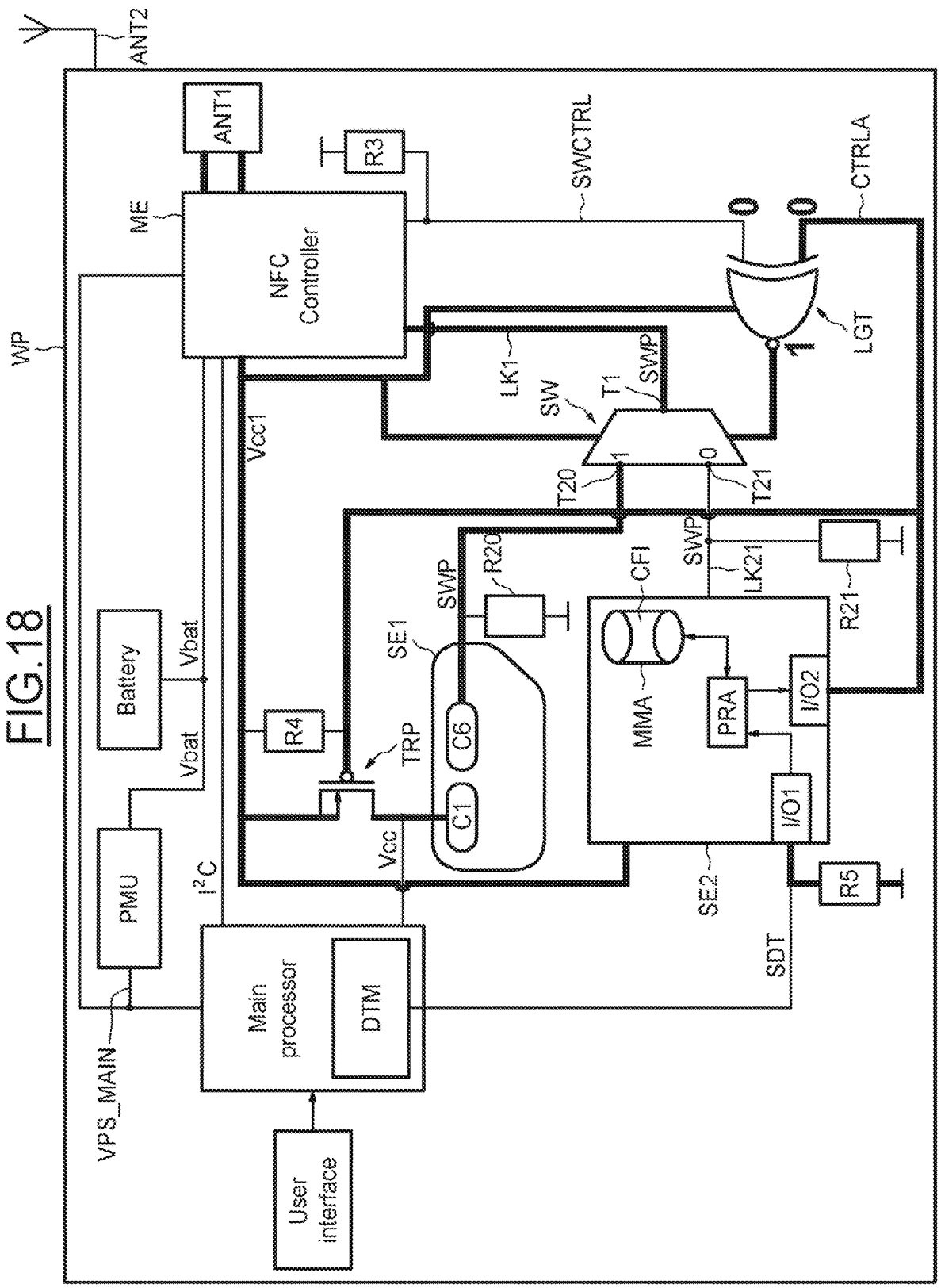

Reference is now made to FIG. 18, to illustrate the case where secure element SE1 is designated by the configuration indication CFI for cooperating with the NFC controller ME through the SWP link during the low operation mode.

In the low power mode, the secure element SE2 is powered by the voltage Vcc1 provided by the NFC controller.

Upon receipt of the detection signal SDT having the logical value "0", the auxiliary processing means PRA read the configuration indication CFI stored in the auxiliary memory means and deliver the control signal CTRLA having here the logical value "0".

Consequently the transistor TRP is ON and the secure element SE1 is also powered by the voltage Vcc1.

Since the control signal SWCTRL is forced to the logical value "0" by the pull down resistor R3, the EXNOR gate LGT powered by Vcc1, delivers a logical value "1" to the control input of the switch SW also powered by Vcc1, allowing the selection of the secure element SE1.

It should be noted here that the secure element SE1 is powered before being selected by the switch SW due to the delay introduced by the EXNOR gate LGT.

The means PRA, MMA, TRP, R4 form also auxiliary power control means configured to control the powering of secure element SE1 and SE2 from said configuration indication.

Of course, as both secure elements SE1, SE2 are powered in the low power operation mode, the part LK21 of SWP link seen by the non-selected secure element SE2 is forced in its deactivated state by the pull-down resistor R21.

According to an aspect of the invention, it is thus possible to exchange information between a main element and two auxiliary elements through a controllable multiplexer/demultiplexer switch without modifying the operating system of the secure element. Further, only a small modification of the operating system of the NFC controller is needed for controlling the analogue multiplexer/demultiplexer switch SW.

Although different embodiments of the invention have been disclosed with two secure elements, other embodiments including more than two secure elements connected to the master SWP interface through a multiplexer/demultiplexer switch SW are also possible.

Further although the analogue switch SW has been located outside the main element and the slave elements, it would be possible to integrate the switch (and eventually the EXNOR gate) within the single package SPCK or directly within the main element. In such a case the outputs of the main element would be for example the terminals T20 and T21 of the switch, and terminal T1 of the switch would be connected to the processing means of the master interface within said main element.

What is claimed is:

1. A circuit, comprising:
   a near field communication (NFC) controller having a single wire protocol (SWP) input/output port and a control port;
   a first secure element configured to exchange data with the NFC controller through a first SWP communications link;

a first pull-down resistor coupled between the first SWP communications link and a reference ground, the first pull-down resistor configured to force the first SWP communications link to the reference ground during a deactivation state of the first secure element;

a second secure element configured to exchange data with the NFC controller through a second SWP communications link;

a second pull-down resistor coupled between the second SWP communications link and the reference ground, the second pull-down resistor configured to force the second SWP communications link to the reference ground during a deactivation state of the second secure element; and a switch having a control terminal coupled to the control port of the NFC controller, an input terminal coupled to the SWP input/output port of the NFC controller, a first output terminal coupled to the first secure element through the first SWP communications link, and a second output terminal coupled to the second secure element through the second SWP communications link.

2. The circuit of claim 1, wherein the NFC controller is configured to provide a control signal to the switch via the control port, wherein the control signal is configured to cause the switch to enable the first SWP communications link and to disable the second SWP communications link or vice versa.

3. The circuit of claim 2, wherein the control signal is configured to couple the input terminal to the first output terminal and to decouple to input terminal from the second output terminal to enable the first SWP communications link and to disable the second SWP communications link.

4. The circuit of claim 2, wherein the control signal is configured to couple the second output terminal to a reference voltage to disable the second SWP communications link.

5. The circuit of claim 4, wherein the reference voltage comprises a ground potential.

6. The circuit of claim 1, wherein the switch comprises a multiplexer.

7. The circuit of claim 1, wherein the NFC controller and the switch are comprised within a single chip package.

8. The circuit of claim 1, wherein the NFC controller is comprised within a single chip package, and wherein the switch is located outside the single chip package.

9. The circuit of claim 1, wherein at least one of the first secure element or the second secure element comprises a smart card conforming to a European Telecommunications Standards Institute (ETSI) standard.

10. The circuit of claim 1, wherein at least one of the first secure element or the second secure element is configured to store protected information for exchange with the NFC controller.

11. The circuit of claim 10, wherein the protected information comprises information related to banking or a service subscription.

12. The circuit of claim 1, wherein the SWP input/output port comprises an only SWP input/output port of the NFC controller.

13. A circuit arrangement, comprising:
a first secure element configured to store first secured information;
a second secure element configured to store second secured information;
a multiplexer having a first terminal coupled to a single wire protocol (SWP) port of the first secure element, and a second terminal coupled to the SWP port of the second secure element;
a near field communication (NFC) controller comprising an input/output terminal coupled to a third terminal of the multiplexer, wherein the NFC controller is configured to communicate with the first secure element or the second secure element via a SWP communications channel mediated through the input/output terminal, the NFC controller further comprising a control terminal coupled to a fourth terminal of the multiplexer; and
a pull-down resistor coupled between the fourth terminal of the multiplexer and a reference ground, the pull-down resistor configured to force the multiplexer to be in a pre-determined configuration for communications between the NFC controller and one of the first and second secure elements in an absence of a control signal originating from the NFC controller.

14. The circuit arrangement of claim 13, wherein the NFC controller and the multiplexer are housed within a single chip package.

15. The circuit arrangement of claim 13, wherein the NFC controller and the multiplexer are housed within separate chip packages.

16. The circuit arrangement of claim 13, wherein at least one of the first secure element or the second secure element comprises a smart card conforming to a European Telecommunications Standards Institute (ETSI) standard.

17. The circuit arrangement of claim 13, wherein the input/output terminal is an only input/output port of the NFC controller configured to exchange information with the first secure element or the second secure element via the SWP communications channel.

18. A near field communication (NFC) controller, comprising:
a single wire protocol (SWP) port configured to exchange information with a first secure element or a second secure element external to the NFC controller via an SWP communications link;
a control circuit configured to modulate communication of the NFC controller with one of the first secure element or the second secure element via the SWP communications link;
a control port coupled to the control circuit and configured to provide a control signal indicative of whether the NFC controller is to communicate with the first secure element or the second secure element via the SWP communications link;
a switch, wherein the control signal is configured to cause the switch to couple the SWP port to the first secure element or the second secure element, and wherein the SWP port, the control circuit, the control port, and the switch are integrated within a single element; and
a pull-down resistor coupled between the control port of the switch and a reference ground, the pull-down resistor configured to force the switch to be in a pre-determined configuration for communications between the NFC controller and one of the first and second secure elements in an absence of a control signal originating from the NFC controller.

19. The NFC controller of claim 18, wherein the SWP port is an only SWP port of the NFC controller.

20. The NFC controller of claim 18, wherein the control signal is configured to cause the SWP port to couple to the first secure element and to decouple from the second secure element.

21. The NFC controller of claim 18, wherein the switch comprises a multiplexer.

22. The NFC controller of claim 18, wherein the SWP port, the control circuit, and the control port are disposed on a first substrate, the switch is disposed on a second substrate, and the first substrate and the second substrate are disposed in a single package.

23. The NFC controller of claim 18, wherein the SWP port, the control circuit, the control port, and the switch are integrated within a single element.

24. The NFC controller of claim 18, wherein the SWP port is an only SWP port of the NFC controller.

25. The NFC controller of claim 18, wherein the control circuit is further configured to generate the control signal based on determining whether the NFC controller is to communicate with the first secure element or the second secure element via the SWP communications link.

26. The NFC controller of claim 18, wherein the control signal causes the SWP port to couple to the first secure element and to decouple from the second secure element.

27. The NFC controller of claim 18, wherein the control signal enables the SWP communications link between the NFC controller and the first secure element and disables the SWP communications link between the NFC controller and the second secure element.

28. The NFC controller of claim 18, wherein the SWP communications link between the NFC controller and the first secure element comprises an SWP communications channel between the NFC controller and a subscriber identification module (SIM) card.

29. The NFC controller of claim 18, wherein the SWP communications link between the NFC controller and the second secure element comprises an SWP communications channel between the NFC controller and a universal integrated circuit card (UICC).

30. The NFC controller of claim 18, wherein the control signal causes the switch to electrically couple a second terminal of the NFC controller to a SWP communications terminal of the first secure element and to electrically decouple the second terminal of the NFC controller from a SWP communications terminal of the second secure element.

31. The NFC controller of claim 18, wherein at least one of the first secure element or the second secure element comprises a smart card conforming to a European Telecommunications Standards Institute (ETSI) standard.

32. The NFC controller of claim 18, further comprising an antenna terminal coupled to an antenna, the antenna terminal configured to exchange information with a contactless reader using a contactless communications protocol.

* * * * *